United States Patent [19]
Franz et al.

[11] 3,734,415
[45] May 22, 1973

[54] APPARATUS FOR THE PREPARATION OF SOLID INTERMEDIATES OF POLYADDITION RESINS IN THE FORM OF CONNECTED PIECES USEFUL FOR BREAKING AND GRINDING

[75] Inventors: Peter Franz, Mumpf; Andreas Maier, Pratteln, both of Switzerland

[73] Assignee: Buss A.G., Basel, Switzerland

[22] Filed: Nov. 24, 1971

[21] Appl. No.: 202,027

Related U.S. Application Data

[62] Division of Ser. No. 856,336, Sept. 9, 1969, Pat. No. 3,643,874.

[52] U.S. Cl..................241/65, 241/101 R, 425/202, 425/325
[51] Int. Cl...............................................B02c 19/00
[58] Field of Search.................241/65, 101 B, 101 R, 241/3, 23; 100/95; 425/202, 296, 304, 308, 313, 316

[56] References Cited

UNITED STATES PATENTS

| 2,755,509 | 7/1956 | Smidth | 241/3 |
| 2,938,230 | 5/1960 | Sainty | 425/296 |

*Primary Examiner*—Robert L. Spruill
*Attorney*—A. A. Saffity

[57] ABSTRACT

Apparatus for the preparation of polyaddition resins, including means for proportioning and feeding base compositions in a mixing and kneading machine, mixing them with simultaneous heating or cooling, in a solid and/or liquid state, plasticizing and homogenizing the compositions, expelling resin mix through a heated die onto a cooling belt, solidifying and preforming the resin mix into loosely connected small pieces, and breaking up as well as grinding the preformed pieces of the resin mix. Optionally crushing may be performed before the breaking and grinding step.

1 Claim, 1 Drawing Figure

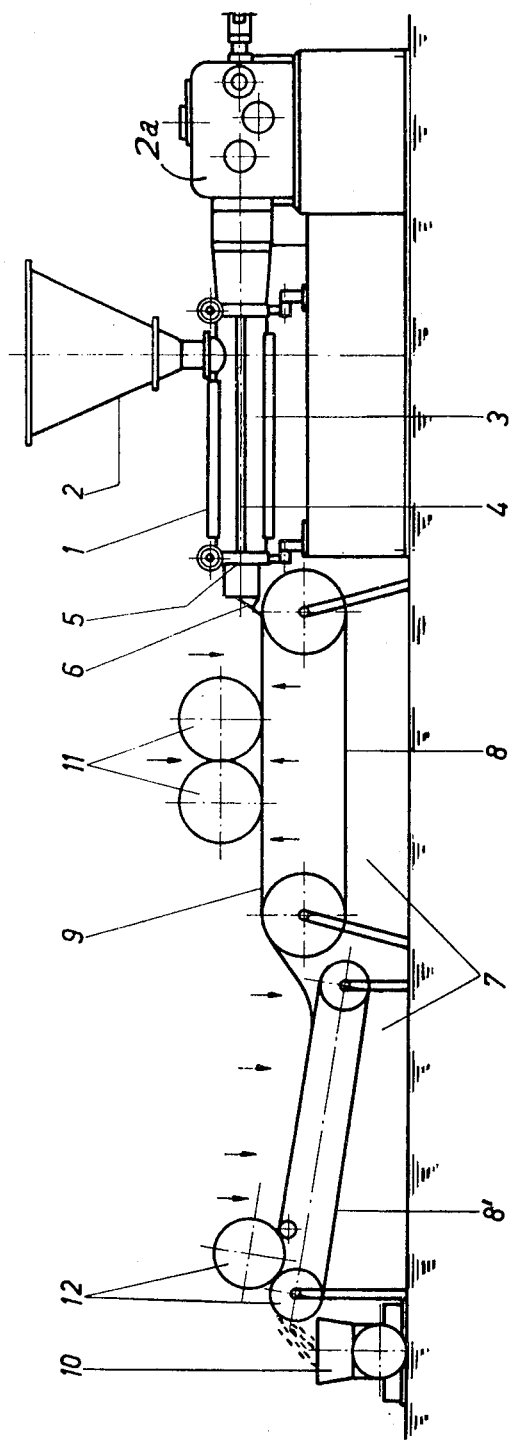

APPARATUS FOR THE PREPARATION OF SOLID INTERMEDIATES OF POLYADDITION RESINS IN THE FORM OF CONNECTED PIECES USEFUL FOR BREAKING AND GRINDING

This is a divisional of application Ser. No. 856,336, filed Sept. 9, 1969, titled "Process for the Preparation of Intermediates of Polyaddition Resins," now U.S. Pat. No. 3,643,874 issued Feb. 22, 1972.

The present invention relates to an arrangement for the preparation of intermediates of resins prepared by polymeric addition or condensation.

There is known a group of special formulations of synthetic resins prepared by polymeric addition or condensation, and consisting of resin-forming molecules, of a hardener and further additions, where a desirable continuous process homogeneously to produce resin intermediates, without cross-linked molecules and alternatively only with so-called partial links, has been very difficult or impossible to perform.

Unsurmountable difficulties in continuous processing occurred especially if the processed materials developed adhesive tackiness with a tendency to premature hardening.

Many synthetic resins are however known, by bringing together for subsequent total polymerization different molecular compounds with the addition of hardeners and other substances such as accelerators, pigments, fillers, etc., which result in very useful properties of hardness, toughness, corrosion resistance and bonding. It is therefore desirable to prepare homogeneous mixes of such resins as intermediates, with or without controlled linkages or partial links.

The individual components used in liquid or solid state for such preparations are often very difficult to mix homogeneously, and they pass mostly through pasty or liquid intermediate mixing states exhibiting extensive tackiness so that it becomes difficult to prevent some formation of too advanced cross-linking, resulting in some completely and prematurely hardened particles. These detract from the desired properties of the final product, making the same sometimes useless.

The difficulties are even more increased because the intermediate resin has to be prepared and homogenized in a heated state where too much or too long heating starts and accelerates the completion of cross-linking and hardening. Therefore and intermediate resinous product must be removed as quickly as possible from the mixing and homogenizing zone, with subsequent cooling while it will solidify.

The final user requires the intermediate resin as a fine powder for which the solidified intermediate has to be broken into lumps and then mill-ground, again with careful precaution to keep frictional heating as low as possible during the treatment.

Cited are polyesters, polyester-polyamide mixes and especially epoxy resins prepared by polymeric addition or condensation, and exhibiting the above-mentioned difficulties.

Analyses of the individual reactions show that it might be possible to overcome the above disadvantages if final products with somewhat inferior properties would be acceptable, such as for example if a less reactive hardener is substituted, thereby reducing or preventing the tackiness in the intermediate resin product.

A truly advantageous solution of the problem was however found only when a new process and arrangement for carrying out the same were discovered as disclosed below.

The process according to this invention, as covered by the aforementioned U.S. Pat. No. 3,643,874 characterized in continuously proportioning and feeding solid and/or liquid base compositions into the inlet of a continuously operating mixing and kneading machine. There the products are intensively mixed in both longitudinal and transversal directions, with simultaneous heating or cooling, plasticized and homogenized during a brief average dwell time in the mixing chamber of the machine. Then the thus formed intermediate resin mix is expelled continuously through a heated die onto a cooling belt where it solidifies and is preformed into loosely connected small pieces, whereafter the now solid but friable mix is broken up and finely ground.

An apparatus suitable for the execution of the process is characterized by a continuously operating mixing and kneading machine, provided for heating and/or cooling, and with a working screw having combined rotational and to-and-fro movements, and being equipped with a heatable outlet die followed by an endlessly moving cooling stretch, in conjunction with which a preforming device is arranged which is followed by a breaking and grinding device for size reduction.

In the following an example is given for which the process of the continuous preparation of a lacquer-resin powder, based on an epoxy resin, is described and illustrated as an example in the sole FIGURE of the accompanying, somewhat schematic, drawing.

A rotating and reciprocating mixing and kneading machine of the type disclosed in U.S. Pat. Nos. 3,219,320 of F. Sutter entitled "Method of Continuous Kneading and Mixing and an Arrangement for Carrying out the Method" issued Nov. 23, 1965, and 3,367,635 of W. Gresch entitled "Arrangement for the Degasification of Plastic Masses During their Treatment by Means of a Continuous Mixing and Kneading Worm" issued Feb. 6, 1968, is used continuously and homogeneously to prepare the intermediate product.

The continuous rotating and reciprocating mixing and kneading worm machine has a casing which can be flapped open and is provided with heating and/or cooling zones in members 1. The kneading screw inside the casing also has provisions for heating and/or cooling. The machine has provisions for differently heating different mixing and kneading zones therein. Also, the moving parts of the kneader can optionally be heated to a different, preferably lower, temperature than the stationary parts thereof. In carrying out the inventive process, the mixing and kneading machine is preferably started with slow speed which is then increased until full operational speed is reached. The mixing and kneading machine is characterized by the required advantageous longitudinal and transversal mixing, and by an ideal average dwell time.

The outlet of the mixing and kneading machine is equipped with a die 5 provided with a horizontal slot beneath which a small chute 6 is disposed, adapted to the gliding or slipping properties of the mass of outgoing material leaving the die. In the exemplary arrangement this chute 6 is formed with form of a heatable wedge-shaped chute which is inclined downwardly and extends as an extended underlip of the die slot.

This wedge is immediately followed by a cooling station stretch 7 having two parts. The first part consists of an endless belt 8 made preferably of stainless steel, in conjunction with which preforming indented rolls 11 are arranged. Subsequently, at a selected distance, the rolls are followed by optional crushing rolls 12. The end of the processing line then consists of a grinding mill 10 fed with the product already reduced to coarse size by the crushing rolls 12.

The basic techniques are well known and can be used to bring the starting material into the working chamber of the continuously operating kneader either as liquids or solids. Liquids can be fed premixed or individually into the kneader inlet, shown in the form of a hopper 2, or through one or more kneading teeth having bores therein and disposed at selected positions along the casing of the mixing and kneading machine. Solids can be equally fed premixed or individually into the kneader inlet. If required partial evacuation means can be used to extract removable gases or vapors.

In this example the alternative with premixed starting products is described. Epoxy resin base, hardener, fillers, pigment, etc., possibly wetted with liquid additives, are premixed and charged into the feed hopper 2 provided with an adjustable drive 2a for a vertical feed screw the shaft of which also carries stirrer arms for the upper part of the hopper, thereby preventing bridging and assuring an equalized and constant feed into a kneader chamber 3. A schematically shown kneader screw 4 has interrupted flights and executes a combined rotational and to-and-fro movement.

The interrupted screw flight thus forms, together with the kneading teeth fixed in the kneader casing, a large number of individual mixing chambers in which the more or less dry starting material is intensely mixed, plastified and homogenized under the influence of the introduced energy. Adaptation to the resulting volume change of the material is obtained by inserting gap closing elements between some of the flight vanes, as described in the aforementioned U.S. Pat. No. 3,219,320.

The homogeneously mixed components initially form a pasty and tacky mass which is quickly conveyed onwards and then arrives with relatively low viscosity at the outlet die 5. The mass leaves the kneader with low viscosity through the die 5 which is heated to prevent sticking or blocking through freezing of the mass. The underlip of the die is extended as the heatable wedge-form incline 6, thereby enabling smooth transfer onto the cooling stretch 7.

The first part of the stretch 7 is formed by the endless, preferably stainless belt 8 with a highly polished surface because the intermediate resin, still a warm plastic, tends to stick to surfaces and might also react with rubbers or plastics while it is warm (such as with belting materials).

While cooling, the intermediate resin forms a solid and friable strand of material schematically shown at 9 which has to be broken and finely ground before the intended use. Energy input during breaking and grinding can advantageously be reduced if the material can be fed into the mill 10 in small pieces of regular size. This is obtained by passing the strand of material 9, while still plastic, underneath the rolls 11, which results in loosely interconnected tablets or pieces of regular size which are easily fed, by way of at least one, preferably elastic, endless belt 8', to the subsequent size reduction device.

The crusher 12 reduces with light force the now cold and friable tablets to regular small size which then can be ground to powder in the mill 10, with low energy requirement.

What we claim is:

1. In a rotating and reciprocating mixing and kneading worm machine for the continuous preparation of a homogeneous plasticized mass of polyaddition resin in solid or liquid form and discharge at a cooling station to form a mass, combined with means which is adapted to break the molded mass up into small pieces, said worm machine having a housing, a rotating and reciprocating worm shaft in said housing to mix in longitudinal and transverse directions, the ingredients forming the resin intermediate in sticky or plasticized state, heating means for said worm shaft, heating means for said housing, and an outlet from which the plasticized resin mix is discharged to the cooling station, that improvement consisting of:

a. a heatable die mounted at the outlet of said housing;
    b. said die having a horizontal slot through which the intermediate mass is discharged;
    c. said slot having a heatable wedge-shaped and extended underlip which is inclined downwardly to form a chute through which the resin mass glides or slips;
    d. a cooling station comprising first conveyor means including a conveyor belt of stainless steel which removes the mass flowing thereon through said chute and cools it to solidify said mass, the stainless steel preventing the mass from sticking to the surface, said second conveyor means including an elastic conveyor belt;
    indenting rolls mounted above said stainless steel belt for indenting said mass against said steel belt and thereby providing indented pieces in the mass adapted to be broken up into small pieces by breaking and grinding; and
    f. a crusher roll located downstream of said indenting roll at the discharge end of said elastic belt which crusher breaks up the mass of indented pieces delivered by said elastic belt.

* * * * *